United States Patent Office 3,054,103
Patented Sept. 11, 1962

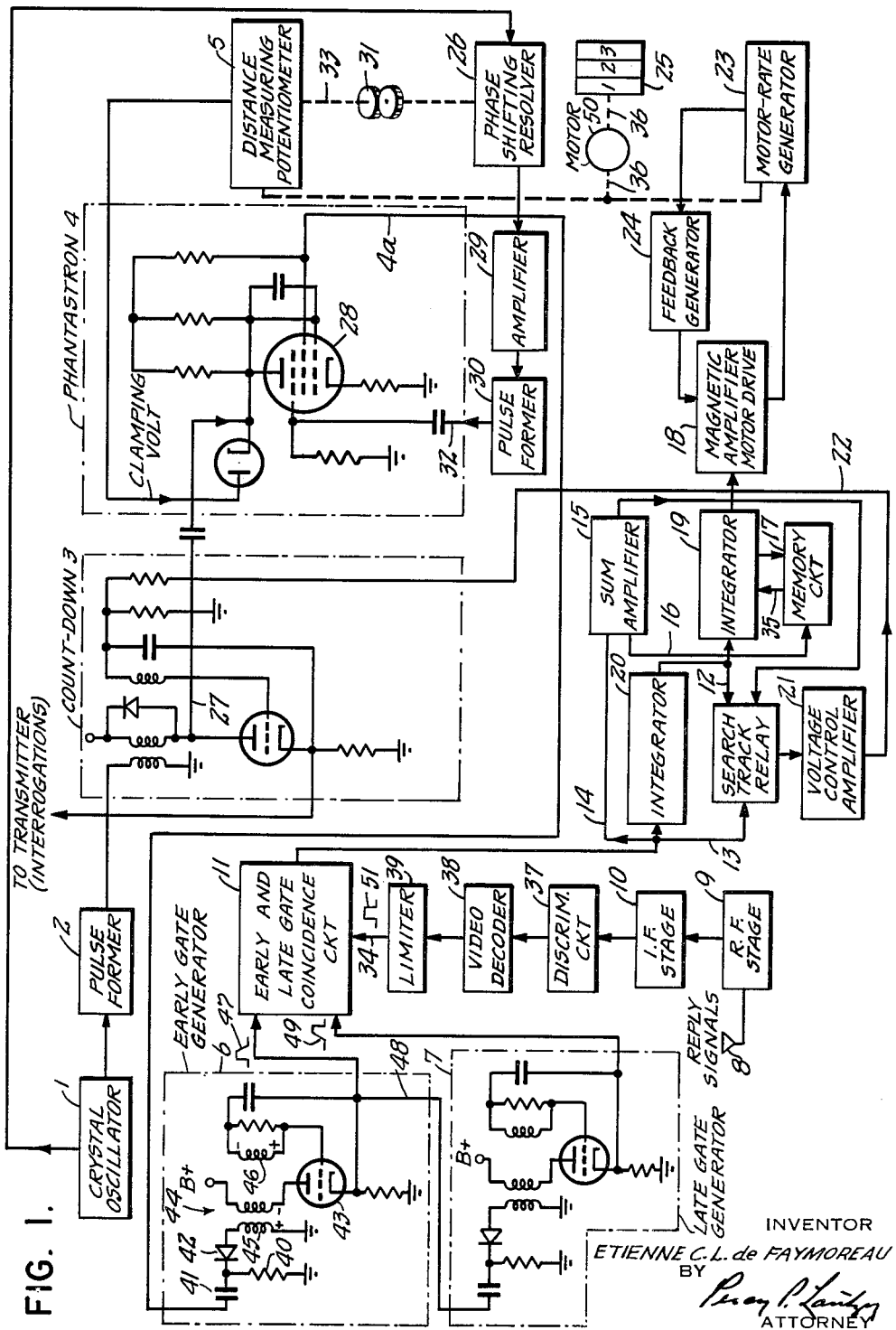

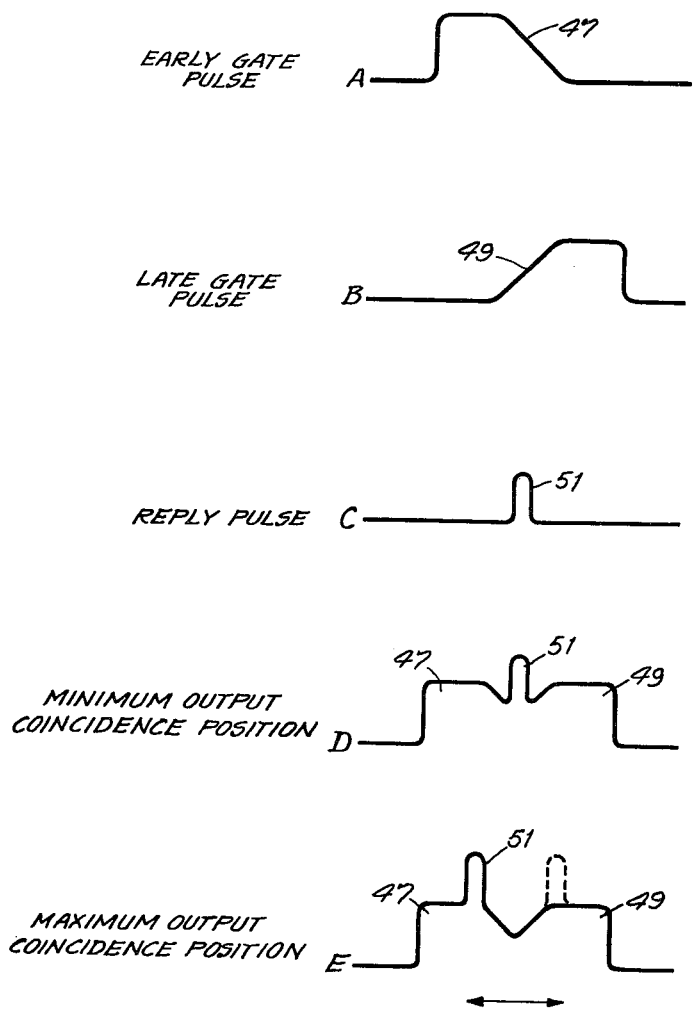

3,054,103
DISTANCE MEASURING SYSTEM PROVIDING INTERROGATION RATE CONTROL
Etienne C. L. de Faymoreau, Nutley, N.J., assignor to International Telephone and Telegraph Corporation, Nutley, N.J., a corporation of Maryland
Filed Dec. 23, 1957, Ser. No. 704,612
9 Claims. (Cl. 343—13)

This invention relates to a distance measuring system and more particularly to a device for controlling the rate of interrogation signals in accordance with the need for a higher or lower rate of reply signals.

In air navigation systems, for example, distance measuring equipment provides a mobile unit with an indication of distance from a beacon transponder unit at a known location. The mobile unit transmits a coded group of interrogation signals which are received by the ground beacon transponder and which are re-transmitted to the mobile unit whose receiver detects the reply signal. The range circuits of the mobile unit measure the elapsed time between the pulse coded interrogation and the received reply and converts this time measurement into an indication of distance which is displayed on appropriate equipment, such as a distance meter.

Beacons used for distance measuring purposes usually have provisions for automatically preventing responses to an excessive number of interrogations. These provisions are necessary in order to avoid overloading the beacon transmitter when a large number of craft are interrogating the beacon at the same time. As a result of this, a definite limitation is placed on the traffic handling capacity of the beacon transmitter. Therefore, in order to lessen the load on the beacon, it is proposed to make the rate of interrogation as low as possible, depending on the need of the craft to know. A craft moving at a faster or increasing rate of speed needs more information than a craft moving at a slower rate. Even more, the need of a craft to know varies in accordance with its acceleration or deceleration. Therefore, information in the form of a voltage which would be proportional to the acceleration of the mobile craft toward or away from the beacon so as to control automatically the repetition rate of the interrogation pulses is highly desirable. Such control will result in a considerable reduction in the loading of the beacon and consequently increase the traffic handling capacity of the beacon.

An object of the present invention, therefore, is to provide for mobile craft an improved distance measuring system having means to control the repetition rate of interrogation signals in accordance with the information needs of the mobile craft; and a further object is to make the rate of interrogation dependent on the change of velocity of the mobile craft, thereby resulting in the responder beacon being able to handle a greater number of aircraft. Still another object is to provide a control circuit for a phantastron to control the duration of the output pulse thereof.

One of the features of this invention is the provision in a distance measuring system of a range gate consisting of two scanning pulses (the early and the late gating pulses) which continuously search through a predetermined range in an effort to locate the ground beacon's reply signal. During search the pulses are driven outward over the range at a distance from 0 to 200 miles in 20 seconds. These "search" cycles are repeated continuously until the range gate finds the reply signal and locks on to it. Once the reply pulse is found, the range gate will stay locked on to it, or "track" it, automatically. A control circuit is provided for controlling the interrogation rate of the signals radiated by the mobile craft; the rate of interrogations will be dependent on the changes of velocity of the mobile craft or manually in accordance with the need for a higher rate of reply pulses. In addition, the aircraft equipment will measure the elapsed time between an interrogation pulse and a reply pulse and will convert this time interval into a distance display on the range indicator.

Another feature of this invention is the inclusion of accurate means to control the duration of an output pulse of a phantastron, such as required for searching.

A further feature of this invention is the provision of a velocity memory circuit which maintains the circuitry in a "track" condition during a momentary loss of reply signals but returns the system to a "search" condition if the reply signals are lost for any appreciable period of time.

The above-mentioned and other features and objects of this invention will become more apparent by reference to the following description taken in conjunction with the accompanying drawings, in which:

FIG. 1 is a block and schematic diagram of an embodiment of the distance measuring system in accordance with the principles of my invention; and FIG. 2 is a graph helpful in explanation of the embodiment.

Referring in general to the drawings, the distance measuring equipment in accordance with this invention comprises a crystal oscillator 1 which is coupled to a pulse former 2. The output of the pulse former 2 is fed into a count-down blocking oscillator 3, which generates pulses which are in synchronism with its input but which will have a different pulse repetition frequency depending on whether the distance measuring equipment is in "search" or "track" operation. The output of count-down circuit 3 is coupled to a phantastron circuit 4. The phantastron 4 generates a pulse whose amplitude and duration are dependent on the output of a D.C. clamping voltage derived from the movable arm of the distance measuring potentiometer 5. In addition, the phantastron pulse will be accurately timed by the output derived from pulse former 30, which receives its input from crystal oscillator 1 via phase shifter 26 and amplifier 29. The output pulse of phantastron 4 is coupled over connection 4a to an early gate generator 6 which forms the early gate pulse. The trailing edge of this pulse forms the late gate pulse in late gate generator 7. It is to be noted that the early and late gate generators 6 and 7, respectively, are essentially blocking oscillators and their operation will be explained hereinafter.

The incoming reply pulse signals are picked up on antenna 8 and coupled through the usual radio frequency stages 9, intermediate frequency stages 10 and discriminator circuit 37 to a video decoder 38 where the pulse coded reply signals are recognized. The recognized reply signals are then coupled into early and late gate coincidence circuit 11 through limiter 39. Coincidence of the reply signal with the early and late gate pulses are detected in the early and late gate coincidence circuit 11. Coincidence circuit 11 produces a D.C. output when the incoming reply pulse falls within the early and late gate pulses. This D.C. output is fed into search and track relay 12 along line 13, causing the relay to be energized, thus moving it from the "search" position to the "track" position.

Following non-coincidence between the early and late gate pulses and the reply signals, the output from coincidence circuit 11 is coupled over line 14 to a sum amplifier 15 which acts to maintain the search and track relay 12 in the "track" position for a predetermined period of time. In other words, once a reply signal is lost and lack of coincidence occurs, the sum amplifier 15 will maintain the search and track relay 12 in the "track" position for said predetermined period of time. Likewise, the output of sum amplifier 15 which is fed along line 16 will trigger the memory circuit 17. When triggered, the output of memory circuit 17 is fed to the magnetic amplifier motor drive 18 through integrator 19 in order to continue "tracking" the reply signal for said predetermined period of time. This action will prevent the distance measuring equipment from returning to a "search" condition for said predetermined period of time after the reply signals fade or are non-coincident with the early and late gate pulses.

The pulse signal output of coincidence circuit 11 is also coupled to integrator 20. As a result of integrating the output of early and late gate coincidence circuit 11 in integrator 20, an output is obtained which is indicative of the acceleration or deceleration of the mobile craft. The output of integrator 20 is also fed through the search and track relay 12 (when it is in the "track" position) to a voltage control amplifier 21. The output of voltage control amplifier 21 which is fed along line 22 will vary the bias of the count-down circuit 3. As a result of this, the pulse repetition frequency of the interrogations in "track" condition will be dependent on the acceleration or deceleration of the mobile craft. The output of integrator 20 is also fed into another integrator circuit 19 whose output will be indicative of velocity or change in distance. This output in turn is fed into the magnetic amplifier motor drive 18, which energizes motor rate generator 23 and feedback generator 24. This feedback generator 24 will prevent the magnetic amplifier motor drive from hunting. The shaft position of the motor rate generator 23 is coupled to range indicator 25 through shaft 36 and motor 50 which indicates the distance between the mobile craft and the ground beacon.

Referring now specifically to FIG. 1, the crystal oscillator 1 generates a 4,046-cycle sine wave which acts as a reference signal for the time measurements. The period of this sine wave corresponds to exactly 20 miles of radar range. This sine wave is fed to a phase shifting resolver 26 and at the same time is passed to a pulse former 2 which produces accurate 4,046 pulses per second. The output of pulse former 2 is fed into count-down circuit 3, which generates the pulse repetition frequency of approximately 150 pulses per second during "search" and varying from 1 to 30 pulses per second in "track" in accordance with the change of velocity of the mobile craft. An output taken from the plate of the count-down circuit 3 is then fed along line 27 to the plate circuit of tube 28 of phantastron 4. The phantastron circuit 4 generates a rectangular pulse whose amplitude and duration is determined by the D.C. clamping voltage derived from the distance measuring potentiometer 5. In addition, the 4,046-cycle phase shifted signal which is derived from the phase shifting resolver 26 is then fed to pulse former 30 through amplifier 29. The shaft of this phase shifting resolver 26 is geared down in a ratio of 10 to 1 in gear train 31 to the main shaft 33 of the distance measuring potentiometer 5. Therefore, one complete revolution of the phase shifting resolver 26 contains a phase shift representing one tenth of the total distance of 200 miles or exactly 20 miles. Consequently, the position of the pulses generated by the phase shifted sine wave will represent a distance from 0 to 20 miles depending on the angular position of the phase shifting resolver 26. In addition, the output of pulse former 30 is then fed to the suppressor grid of tube 28 along line 32 which results in cutting off tube 28. The output pulse of phantastron 4, which is taken from the screen grid of tube 28, is then fed to the early gate pulse generator 6. The early gate pulse generator consists essentially of a driven blocking oscillator having a differentiating circuit in its input. The output pulse of phantastron 4 is differentiated in resistor 40 and capacitor 41, and is then fed into diode 42 which only allows the negative pulses to go into the plate circuit of tube 43. Tube 43 is normally non-conducting. The negative pulse which is coupled through diode 42 is fed into winding 45 of transformer 44. Winding 46 of transformer 44 is connected so as to place a positive pulse on the grid of tube 43 which brings the tube into the conducting region and, in turn, initiates the regenerative action. This regenerative action continues until plate current saturation occurs, thus resulting in cutting off tube 43. The regenerative action forms the leading edge of the early gate pulse 47, as shown in FIG. 2, waveform A. The inductance and distributive capacitance of transformer 44 will primarily determine the duration of the desired slope of the trailing edge of early gate pulse 47. This early gate pulse derived from the cathode of tube 43 is then fed via line 48 into the late gate pulse generator 7. The trailing edge of the early gate pulse 47 is used to form the late gate pulse 49, as shown in FIG. 2, waveform B, in late gate pulse generator 7. This late gate pulse generator 7 is essentially the same circuit, and operates in the same manner as early gate pulse generator 6. The early gate pulse 47 and late gate pulse 49 are then fed into the early and late gate coincidence circuit 11.

The reply signals 51 which are picked up by antenna 8 are coupled through the usual radio frequency stages 9, intermediate frequency stages 10, and discriminator circuit 37 to a video decoder 38 where the pulse coded reply signals are recognized. The recognized reply signals having the same code as the transmitted signals are then coupled to a limiter circuit 39. The output reply signals of limiter 39, which appear essentially as reply pulse 51, as shown in FIG. 2, waveform C, are then applied along line 34 to the early and late gate coincidence circuit 11. Upon coincidence of the reply pulses with the early and late gate pulses formed in early and late gate pulse generators 6 and 7, respectively, an output signal will result, which is fed along line 13 to the search and track relay 12 and cause it to operate from the "search" position to the "track" position. The composite pulse signal in coincidence circuit 11 is illustrated in FIG. 2, waveform D. The magnitude of the output signal of coincidence circuit 11 is dependent upon the relative position of the reply pulse 51 and the two intersecting gate pulses, early gate pulse 47 and late gate pulse 49, respectively. When the reply pulse 51 is coincident at the point of intersection of the trailing edge of the early gate pulse 47 and the leading edge of the late gate pulse 49, as shown in FIG. 2, waveform D, the output signal of coincidence circuit 11 is at a minimum. The magnitude of the output signal of coincidence circuit 11 will then rise to a maximum if the reply pulse 51 is coincident with either the peak of the trailing edge of the early gate pulse 47 or with the peak of the leading edge of late gate pulse 49, as shown in FIG. 2, waveform E. In addition, the output signal of coincidence circuit 11 is also fed to integrator 20. This magnitude of the output signal of coincidence circuit 11, which is dependent upon the position of the reply pulse 51 within the two intersecting early and late gate pulses 47 and 49, respectively, is indicative of the acceleration or deceleration of the mobile craft. The output of integrator 20 is then fed into the voltage control amplifier 21 through search and track control relay 12, which is now in the "track" position. It is to be noted that if there is no coincidence between the reply signals and the early or late gate pulses, the search and track relay 12 will remain in the "search" position and the output signal of integrator 20, which is a function of acceleration, will not pass into voltage control amplifier 21. But when the search and track relay 12 is in the "track" position, the output of voltage control amplifier 21 will be fed into the grid of count-down blocking oscillator circuit 3 along line 22. This will result in the pulse repetition frequency of the interrogation pulses generated by count-down blocking oscillator circuit 3 to be dependent on the change of velocity of the mobile craft.

The output of early and late gate coincidence circuit 11 is also fed into the sum amplifier 15 which acts to maintain search and track relay 12 in "track" position providing coincidence is maintained between the early and late gate pulses and a reply signal. Once a reply signal is lost and lack of coincidence occurs, the sum amplifier 15 will maintain the search and track relay in "track" position for a predetermined period of time. Likewise, an output from sum amplifier 15 along line 16 will trigger memory circuit 17. The output of memory circuit 17 coupled over line 35 will cause integrator 19 and magnetic amplifier motor drive 18 to continue "tracking" for said predetermined period of time.

The output of integrator 19 will be fed into magnetic amplifier motor drive 18 which drives the motor rate generator 23. The output of motor rate generator 23 is then fed into feedback generator 24 which acts to buck the voltage input of the magnetic amplifier 20 thereby preventing magnetic amplifier motor drive 18 from hunting. The output of motor rate generator 23 is then coupled to range indicator 25 through shaft 36 and motor 50. Range indicator 25 will then indicate the distance between the mobile craft and the ground beacon.

While I have described above the principles of my invention in connection with specific apparatus, it is to be clearly understood that this description is made only by way of example and not as a limitation to the scope of my invention as set forth in the objects thereof and in the accompanying claims.

I claim:

1. A distance measuring system comprising a transmitter to radiate signals, a receiver to detect signals radiated by an object whereby the distance to the reradiating object can be determined, a count-down blocking oscillator for said transmitter in order to control the repetition rate of its signal transmission, trigger pulse generating means synchronized with the transmission rate of said transmitter to generate a triggering pulse signal, a first blocking oscillator which generates an early gate pulse responsive to said trigger pulse signal and whose amplitude of its trailing edge decreases in time, a second blocking oscillator responsive to the trailing edge of said early gate pulse to generate a late gate pulse having its leading edge adjacent in time to the trailing edge of said early gate pulse and whose amplitude of its leading edge increases in time, a coincidence circuit coupled to the output of said first and second blocking oscillators and to the output of said receiver to produce an output signal responsive to the time coincidence of said early and late gating pulses and said detected reradiated signal, and an integrator circuit coupled to the output of said coincidence circuit and to the input of said count-down blocking oscillator to integrate variations in the time coincidence of the output signal of said coincidence circuit so as to control the repetition rate of signal transmission of said transmitter in accordance with said variations.

2. A distance measuring system comprising a transmitter to radiate signals, a receiver to detect signals reradiated by an object whereby the distance to this reradiating object can be determined, a count-down blocking oscillator for said transmitter in order to control the repetition rate of its signal transmission, trigger pulse generating means synchronized with the transmission rate of said transmitter to generate a triggering pulse signal, a first blocking oscillator which generates an early gate pulse responsive to said triggering pulse signal and whose amplitude of its trailing edge decreases in time, a second blocking oscillator responsive to the trailing edge of said early gate pulse to generate a late gate pulse having its leading edge adjacent in time to the trailing edge of said early gate pulse and whose amplitude of its leading edge increases in time, a coincidence circuit coupled to the output of said first and second blocking oscillator and to the output of said receiver to produce an output signal responsive to the time coincidence of said early and late gating pulses and said detected reradiated signals, an integrator circuit coupled to the output of said coincidence circuit and to the input of said count-down blocking oscillator to produce an output signal whose magnitude is dependent upon the relative position of the detected reradiated signal with respect to the early and late gating pulses so as to control the repetition rate of signal transmission of said transmitter in accordance with said output signal.

3. A distance measuring system comprising a transmitter to radiate signals, a receiver to detect signals reradiated by an object whereby the distance to the reradiating object can be determined, trigger pulse generating means synchronized with the periodic transmission of said transmitter to generate a triggering pulse signal, a first blocking oscillator which generates an early gate pulse responsive to said triggering pulse signal and whose amplitude of its trailing edge decreases in time, a second blocking oscillator responsive to the trailing edge of said early gate pulse to generate a late gate pulse having its leading edge adjacent in time to the trailing edge of said early gate pulse and whose amplitude of its leading edge increases in time, a coincidence circuit coupled to the output of said first and second blocking oscillator and to the output of said receiver to produce an output signal responsive to the time coincidence of said early and late gate pulses and said detected reradiated signal, an integrator coupled to the output of said coincidence circuit and to the input of said count-down blocking oscillator to produce an output signal whose magnitude is a minimum when said detected reradiated signal is coincident at the point of intersection of the trailing edge of the early gate pulse and the leading edge of the late gate pulse and whose magnitude rises to a maximum when the detected reradiated signal is coincident with either the peak of the early gate pulse or with the peak of said late gate pulse, a voltage control amplifier, a relay device coupled to said coincident circuit having two positions which are responsive to the time coincidence of said detected reradiated signal and said early and late gating pulses, the output signal from said integrator being passed through said relay device in one of its positions to said voltage control amplifier, a count-down blocking oscillator, the output of said voltage control amplifier being coupled to said count-down blocking oscillator to control the frequency of operation thereof, said count-down blocking oscillator being coupled to said transmitter in order to control the rate of its signal transmission, a motor, an indicator mechanically coupled to said motor, means controlled by said motor to produce a biasing potential, means to couple said biasing potential to said trigger pulse generating means to vary the timing of said triggering pulse in accordance with said biasing potential, means responsive to the time coincidence of said early and late gate pulses with said detected reradiated signals to control the rotational position of said motor, position of said motor being an indication of the distance between the transmitter and the reradiating object.

4. A distance measuring system as in claim 3, which further includes means for maintaining said biasing potential constant for a predetermined period of time subsequent to the loss of time coincidence between said detected reradiated signal and said early and late gating pulses.

5. A distance measuring system as in claim 3 which further includes means to control the output pulse of said trigger pulse generating means which includes an electron discharge device having a cathode, anode, and at least one control electrode, first means coupling the output of said count-down blocking oscillator to said anode so as to trigger said electron discharge device, a second means coupling the output of said bias producing means to the anode of said electron discharge device to control the duration of said trigger pulse produced by the trigger pulse generating means, and a third means coupling the control electrode of said electron discharge device to block conduction of said electron discharge device.

6. A distance measuring system for determining the distance to a transponder, comprising a transmitter including means to radiate pulses for actuating said transponder, a receiver for receiving the returned pulses from said transponder, means for comparing the timing of said radiated pulses and said returned pulses to determine the distance to said transponder and to produce a voltage the magnitude of which is a function of the acceleration of said system relative to said transponder, and means for applying said voltage to said radiating means to control the repetition rate of pulses radiated therefrom.

7. A distance measuring system for determining the distance to a transponder comprising a transmitter including means to radiate signals for actuating said transponder, a receiver for receiving the returned signals from said transponder, means for comparing the timing of said radiated signals and said returned signals to determine the distance to said transponder and to produce a voltage the magnitude of which is a function of the acceleration of said system relative to said transponder, and means for applying said voltage to said radiating means to control the frequency of signals radiated therefrom.

8. A distance measuring system for determining the distance to a transponder comprising a transmitter including means to radiate pulses for actuating said transponder, a receiver for receiving the returned pulses from said transponder, means responsive to the timing of said radiated pulses and said returned pulses to determine the acceleration of said system with respect to said transponder and to produce a voltage representative thereof, and means for applying said voltage to said radiating means to control the repetition rate of pulses radiated therefrom.

9. A distance measuring system according to claim 8, further including means responsive to said voltage for determining the distance to said transponder.

References Cited in the file of this patent

UNITED STATES PATENTS

| | | |
|---|---|---|
| 2,400,309 | Kock | May 14, 1946 |
| 2,790,167 | Brunn | Apr. 23, 1957 |
| 2,981,942 | Gross | Apr. 25, 1961 |